United States Patent [19]

Bertini

[11] Patent Number: 4,876,931
[45] Date of Patent: Oct. 31, 1989

[54] DEVICE FOR MACHINING A SEALING GROOVE ON AN ENGINE BLOCK

[76] Inventor: Millo Bertini, 679 Garden St., Trumbull, Conn. 06611

[21] Appl. No.: 217,290

[22] Filed: Jul. 11, 1988

[51] Int. Cl.$^4$ .............................. B23B 5/00; B23B 5/48
[52] U.S. Cl. .......................................... 82/128; 82/123; 82/131; 82/132
[58] Field of Search .................... 82/1.2, 1.4, 1.5, 2 A, 82/2 E, 4 R, 4 C, 4 D, 43, 44

[56] References Cited

U.S. PATENT DOCUMENTS

| | | | |
|---|---|---|---|
| 222,820 | 12/1879 | Goodell | 82/4 R |
| 457,960 | 8/1891 | Streiber | 82/4 R |
| 2,074,424 | 3/1937 | Petersen | 82/4 R |
| 2,419,189 | 4/1947 | Morrissette | 82/4 R |
| 3,251,114 | 5/1966 | Lewis | 82/4 R |
| 4,259,885 | 4/1981 | Lindhag | 82/4 R |
| 4,343,207 | 8/1982 | Paysinger | 82/4 R |

Primary Examiner—Frederick R. Schmidt
Assistant Examiner—William E. Terrell
Attorney, Agent, or Firm—Arthur T. Fattibene

[57] ABSTRACT

A hand operated machine tool for machining a groove about a cylinder bore of an engine block having a body portion adapted to be secured in place within a cylinder bore of an engine block, and having a laterally extending rotating arm provided with a cutting tool for machining the groove as the arm is rotated. In one form of the invention, the arm is provided with a lever which is pivoted at one end to the arm and having its other end disposed in engagement with a threaded handle connected to the free end of the rotatable arm. A fulcrum pin is interposed intermediate the ends of the lever whereby relative rotation of the handle and arm causes the arm and the cutting tool to be progressively advanced toward the engine block to perform the cutting operation as the arm is rotated. In another form of the invention, the cutting tool is radially displaced along the arm whereby the relative rotation between the handle and associated arm causes the cutting tool to traverse a spiral path to machine a spiral groove about the cylinder bore as the arm and cutting tool carried thereby is rotated relative to the engine block.

14 Claims, 4 Drawing Sheets

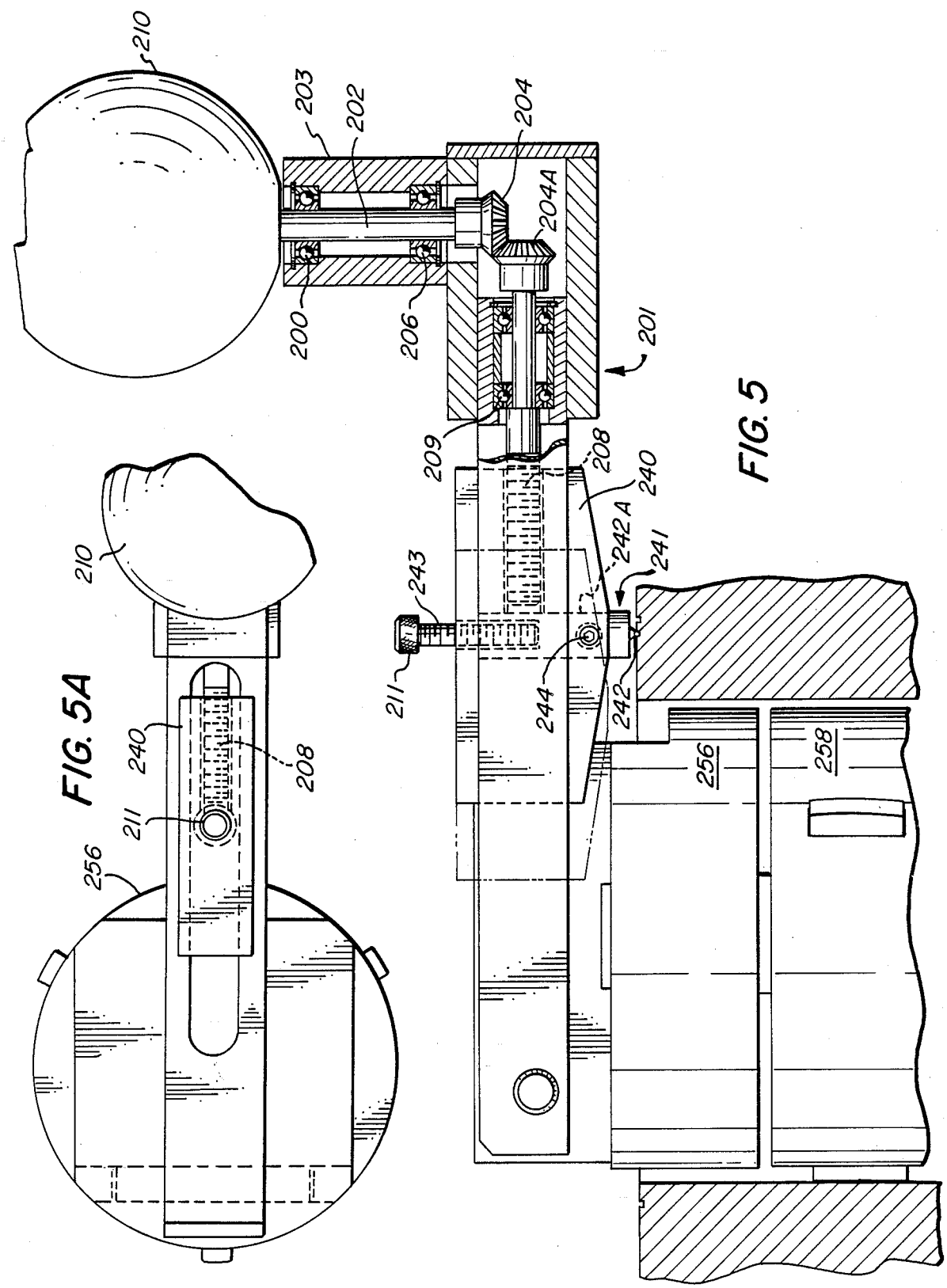

4,876,931

DEVICE FOR MACHINING A SEALING GROOVE ON AN ENGINE BLOCK

FIELD OF THE INVENTION

This invention relates generally to a portable device for performing a machining operation on a cylinder or engine block of an internal combustion engine, and more particularly to a portable hand operated tool for machining an annular or spiral groove around the bore of a cylinder of an internal combustion engine block.

BACKGROUND OF THE INVENTION

To obtain maximum or optimum engine performance from an internal combustion engine, e.g. an automobile engine, high compression ratios are frequently encountered within the cylinder bore of the engine. Such high compressions tend to improve the performance of the engine, but impart added stresses on the gasket or seal disposed between the cylinder block and the cylinder head. In such high compression engines, the head gasket normally disposed between these two parts frequently blows or ruptures. This necessitates a frequent replacement of the head gasket. Heretofore, such replacement of the gasket was a tedious, inconvenient and time consuming operation because the engine must be partially disassembled.

In the past, the problem of frequently blowing the heat gasket due to the high compressions encountered in such engine had been resolved by an expensive and difficult job of removing the cylinder block from the automobile for machining a groove around each cylinder bore. A copper ring or seal would then be placed in each annular groove so machined before reassembling the cylinder block and cylinder head. Such copper ring gasket thus aids to contain the high compression pressures in the cylinder bore, thereby obviating the problem of frequent blowing or rupturing of a conventional head gasket.

While the machining of the sealing grooves and placement of the copper rings adequately resolved the blowing head gasket problem, the machining of such groove proved to be an inconvenient, time consuming and expensive task because typically, the heavy cylinder block had to be completely removed from the vehicle and sent to a machine shop for machining of the sealing grooves therein. In such situations, and especially for an auto enthusiast or racer, the time and expense required to machine such sealing grooves into the cylinder block was either prohibitive or costly. Therefore, without a simple, inexpensive, and convenient way to machine these sealing grooves in a cylinder block, many individuals wishing to do so simply could not afford to and/or the time would not permit such modification.

SUMMARY OF THE INVENTION

The present invention provides a simple, inexpensive, and convenient device permitting the automobile enthusiast or racer to have machined sealing grooves made in a cylinder block of an internal combustion engine without incurring the expense, time or inconvenience heretofore required. The device comprises a body portion that is securely centered in position within a bore of a cylinder and having a lever and/or arm assembly rotatably mounted on the body portion that advances a cutting tool upon each revolution to cut a groove into a cylinder block as the assembly is rotated about the body. In one embodiment of the invention, a lever and arm assembly cuts an annular groove into the cylinder block. In another embodiment, a spiral groove is cut into the cylinder block as the lever and arm assembly is rotated. With a spiral groove cut into the engine block, the need for a copper ring is eliminated.

OBJECTS

It is an object of the present invention to provide a portable tool for machining a groove about a cylinder bore of an internal combustion engine block.

It is a further object of the present invention to make the machining of grooves about a cylinder bore of an engine block less costly and less time consuming.

It is yet another object of the present invention to provide the automotive enthusiast, hobbyist, or racer with an inexpensive alternative to sending a cylinder block to a machine shop for machining a sealing groove about a cylinder bore.

An advantage of the present invention is to avoid the need for sending an engine block to a machine shop for machining of such grooves.

It is a further advantage of the present invention to provide a device for machining a groove about a cylinder bore by a relatively inexperienced operator.

It is yet another advantage of the present invention to provide a machining device for machining a sealing groove in situ in a manner to avoid damage to the cylinder block.

It is a feature of the present invention that the cutting tool automatically advances a predetermined amount upon each revolution of the cutting assembly.

Another feature of the present invention is to provide for a final depth of cut that is independent of the number of cutting rotations.

Another feature of the present invention is to provide for a tool capable of machining a spiral groove on the cylinder block of an internal combustion engine.

These and other objectives, advantages and features will become more readily apparent to those skilled in the art in view of the following more detailed description.

BRIEF DESCRIPTION OF THE DRAWINGS

FIG. 5 is a partial side elevational view of a modified embodiment of the invention. FIG. 5A is a top plan view thereof.

DETAILED DESCRIPTION OF THE PREFERRED EMBODIMENTS

Figure 1:
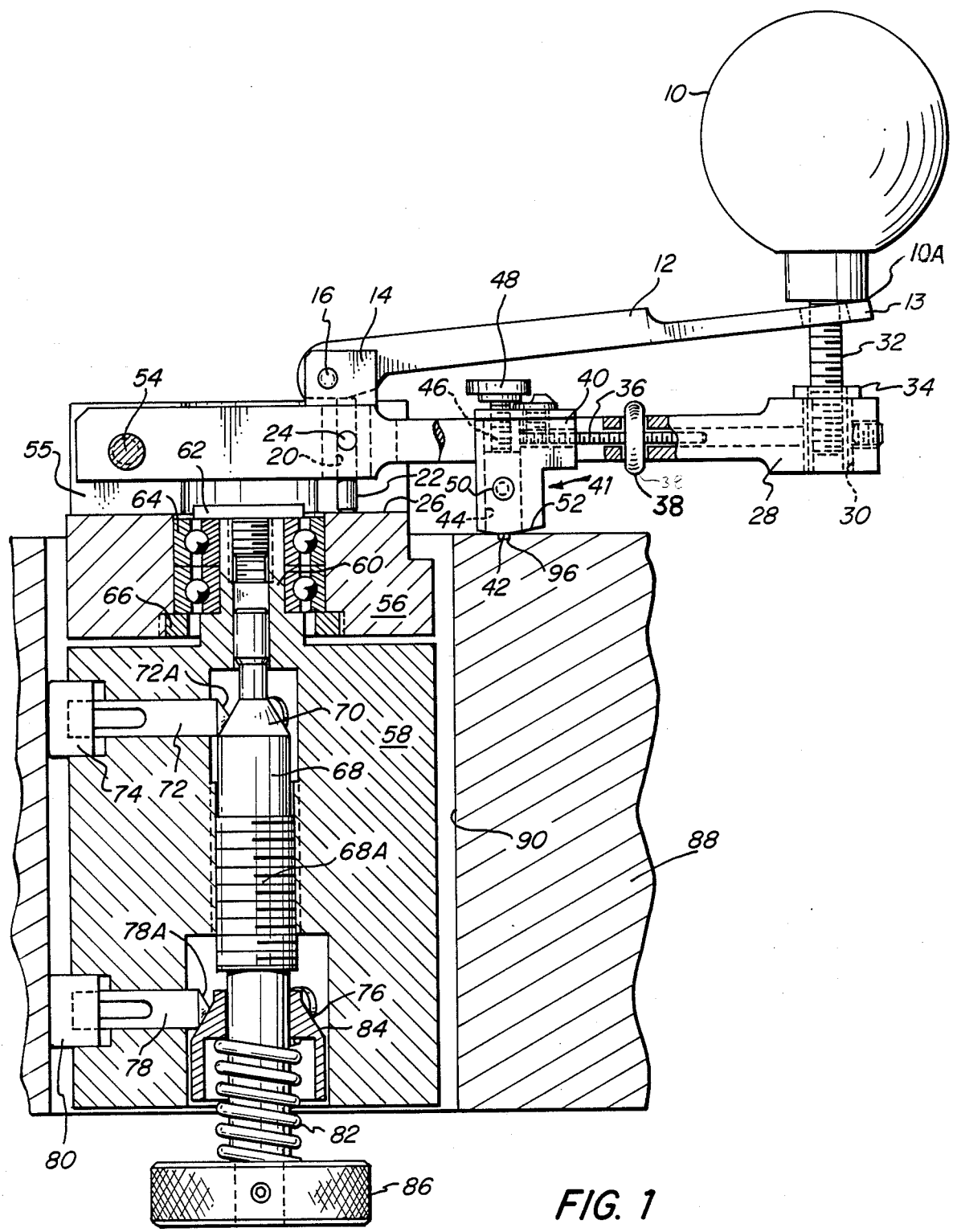
FIG. 1 is a side elevational view in partial section of an embodiment of the present invention.
Figure 2:
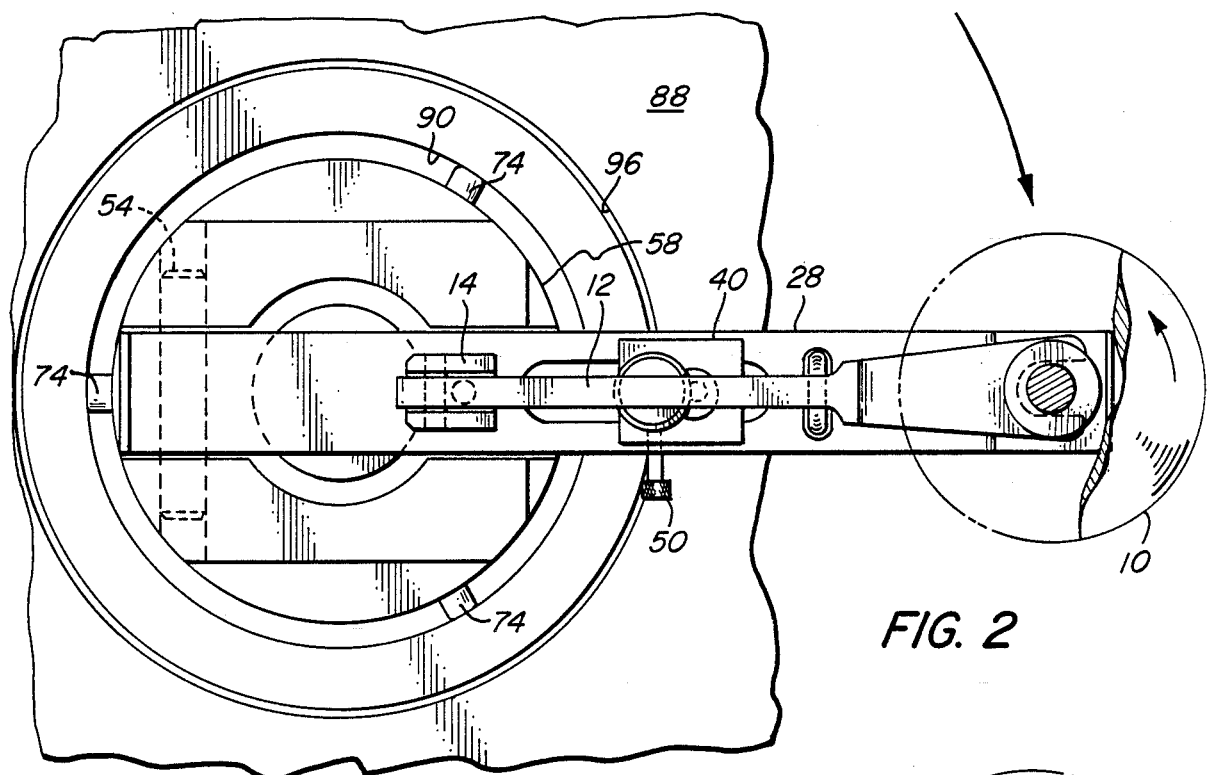
FIG. 2 is a plan view of the illustrated embodiment of FIG. 1.
Figure 3:
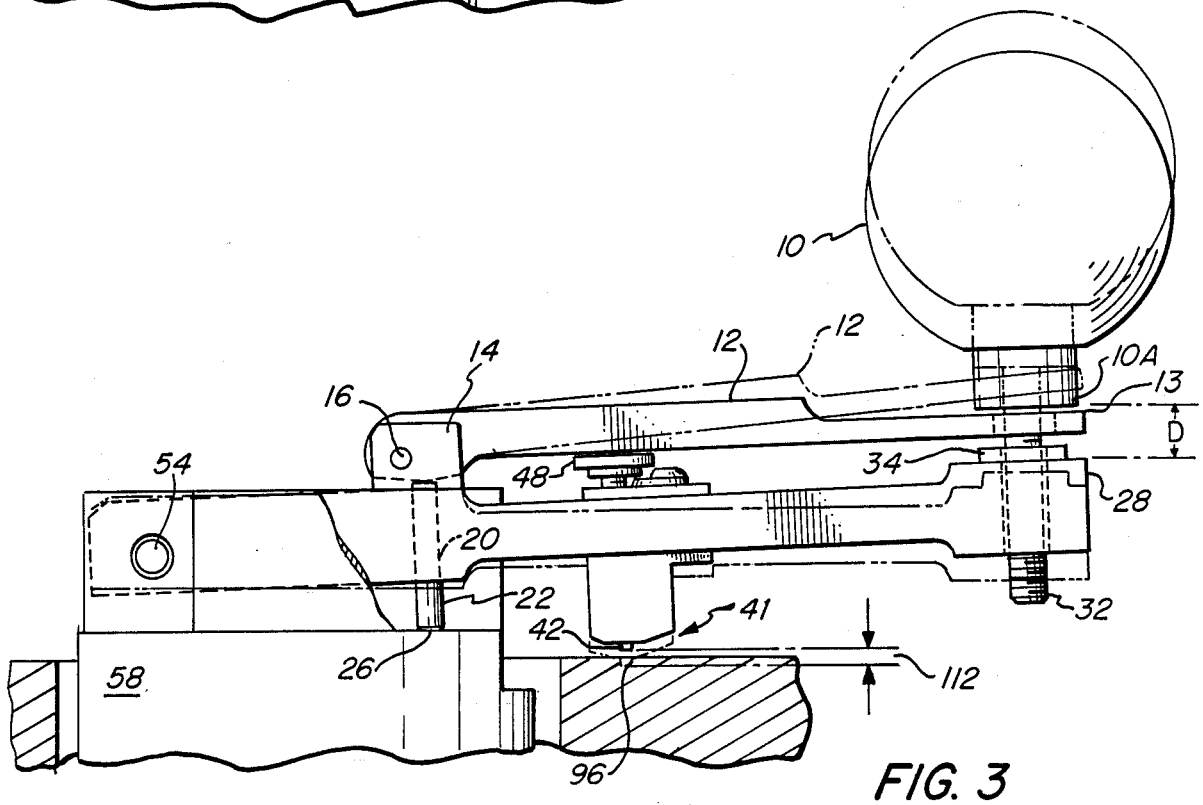
FIG. 3 is a partial side elevational view of the lever and arm assembly of the invention to illustrate the operation thereof.

FIGS. 1 to 3 illustrate one embodiment of the present invention. In. FIG. 1, a handle 10 illustrated as a ball or sphere is shown connected to screw 32 which is threaded into nut 34 carried on arm 28. One end of screw 32 extends into bushing 30 that extends into the arm 28 adjacent the free end thereof. Lever 12 extends between screw 32 and a small clevis 14 attached to arm 28 intermediate thereof. The lever 12 is bifurcated or forked at end 13 to receive the screw 32 such that the lever 12 cannot rise above the base 10A of handle 10. Lever 12 at its other end is pivoted to the clevis 14 by dowel 16. A pin 22 extends through a bore 20 in arm 28 and acts as the fulcrum for lever 12. Pin 22 slides freely in bore 20 and is prevented from sliding completely free by transverse stop pin 24. One end of the fulcrum pin 22 contacts surface 26 of cap 56 and the other end of pin 22 engages lever 12. Cap 56 has a large clevis 55 in which is positioned arm 28. Arm 28 is pivoted to clevis 55 by dowel pin or pivot 54. Adjustably positioned along arm 28 is tool assembly 41. Tool assembly 41 is positioned to be adjusted radially in an out along arm 28 by threaded rod 36 and an adjusting thumb screw 38. The tool assembly 41 comprises a carriage 40 that includes a cutting tool 42 carried in a bore 44 of the tool carriage 40. Carriage 40 is attached or connected to a threaded adjusting rod 36. The tool 42 can be adjusted vertically to vary a particular depth of cut by an adjusting screw 46 attached to turn knob 48. Once tool 42 has been adjusted to a desired predetermined setting or position, it can be secured in placed by set screw 50. The surfaces 52 of carriage 40 are beveled as shown at 52 to provide visibility of the work area.

Cap 56, having arm 28 affixed thereto as described, is rotatably attached to body 58 of the device. The upper end of body 58 is provided with a shaft 60 that extends through cap 56 and is attached thereto by nut 62. A bearing 64 disposed about shaft 60 permits cap 56 to be rotatably mounted about the body 58 and held in palce by lock nut 66.

Body 58 has a center shaft 68 that extends therethrough. On the upper end of center shaft 68 closest to cap 56 shaft 68 has a cam surface 70. About the base of the shaft 68 there is attached a free cam member 84 formed with a tapering cam surface 76 thereon. The free cam 84 is slidably disposed relative to shaft 68 and is held in a normally biased position by a stiff coil spring 82 disposed about the lower end of shaft 68. Shaft 68 is threaded at an intermediate part 68A so that it can be adjusted relative to cap 56 when the attached knob 86 is rotated accordingly. When shaft 68 is adjusted to draw it closer to cap 56 cam surfaces 70 and 76 are forced into contact with corresponding lateral centering pins 72, 78 having tips 72A and 78A respectively which are disposed in pairs circumferentially spaced about the body 58. The respective centering pins 72, 78 are in turn attached to locating feet 74 and 80. The arrangement is such that the top feet 74 and bottom feet 80 will move radially inwardly or outwardly by the engagement of the cams 70 and 76 on the pin ends 72 and 78 accordingly to center the body 58 within the cylinder bore 90.

In FIG. 2, the illustrated embodiment is shown positioned in a cylinder bore 90 of a cylinder block 88. With reference to FIG. 1 and FIG. 2, the body 58 is centered within cylinder bore 90 by top and bottom feet 74 and 80 of the lateral centering pins 72 and 78 which are circumferentially spaced about the body 58. In the illustrated embodiment, the respective centering pins 72, 78 are disposed 120° apart. Once the body 58 is positioned within the cylinder bore 90, knob 86 on shaft 68 is rotated forcing cam surfaces 70 and 76 into contact with tips 72 and 78 driving top and bottom feet 74 and 80 against the surface of cylinder bore 90 to securely enter the body 58 in position within the cylinder bore. Free cam 84 and spring 82 permit bottom feet 80 to vary in radial movement independently of top feet 74. This is to accommodate for any variance in diameter of the cylinder bore 90 between the top and bottom thereof.

Once the body 58 of the device is positioned and centered in the cylinder bore 90, the tool assembly is adjusted to the desired setting along the arm 28. With the tool properly adjusted, the arm 28 is rotated causing tool 42 to machine automatically a groove 96 into cylinder block 68.

The operation of the invention can be best understood with reference to FIG. 3. As arm 28 is rotated clockwise about projection or shaft 60, shown in FIGS. 1 and 2 on the body 58, handle 10 will normally rotate opposite or counter-clockwise with reference to rotation of arm 28. This results in screw 32 tending to unscrew relative to arm 28 to increase the distance "D" between handle 10 and arm 28. As distance "D" increases, the free end of lever 12 is forced to rise to maintain contact with the base 10A of handle 10 as seen in the dotted line showing of FIG. 3. This occurs because of the force acting at the fulcrum point, i.e., the fulcrum pin 22 will urge the free end of the lever 12 away from the arm as the fulcrum pin is interposed between the pivot 16 and the free end 13 of lever 12. As the end 13 of lever 12 rises during the rotation of lever 28, as described, the other end or pivoted end of lever 12 is lowered, causing arm 28 to be displaced toward the engine block to result in automatically lowering the cutting tool 42 as the arm 28 is rotated. This occurs because of the fulcrum pin 22 which is disposed between end 13 and the pivoted end of lever 12. This permits arm 28 to be progressively lowered as the arm rotates clockwise as viewed in FIGS. 2 and 3 for each revolution. As arm 28 is progressively lowered, the tool assembly 41 advances to machine cut an annular groove in the cylinder block 88. The depth of cut by tool 42 is limited by the amount or length that tool 42 extends or projects beyond the tool assembly 41. This assures that no matter how many revolutions of arm 28 that are made, a consistent and controllable depth of cut 96 is achieved. By controlling the pitch of the threads on screw 32, the advance of the cutting tool during a machining operation can be effectively predetermined.

Figure 4:
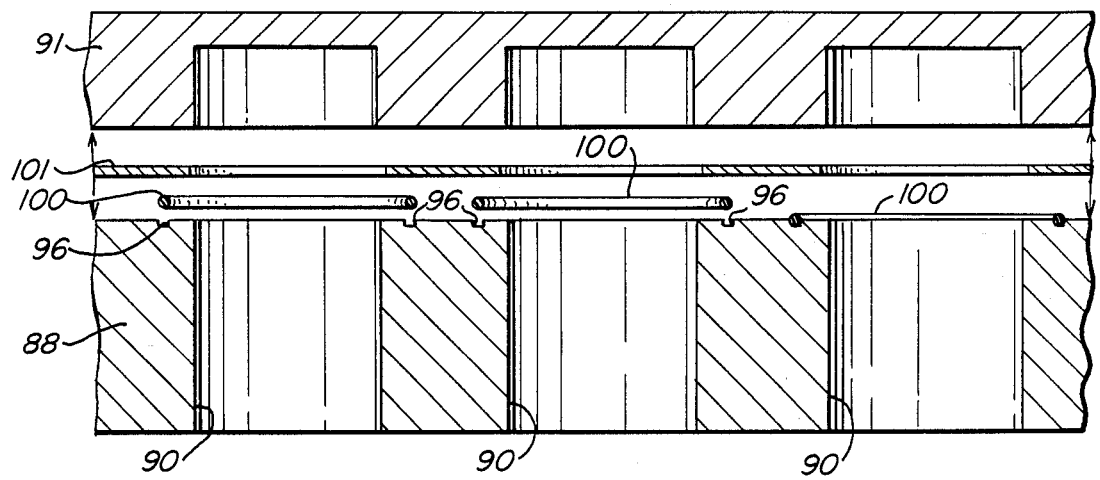
FIG. 4 is an exploded sectional section of an internal combustion engine assembly after the machining of a sealing groove by the illustrated embodiment of the invention of FIGS. 1 to 3.

FIG. 4 illustrates a cylinder block 88 with an annular grooves 96 formed therein according to this invention. A copper or steel ring 100 is positioned in each of the annular grooves 96 around the cylinder bore 90. A head gasket 101 is then placed between the cylinder block 88 and cylinder head 91. The placement of the copper or steel rings 100 within the machined grooves 96 prevents the head gasket 101 from blowing or rupturing when high pressures are developed in the cylinders due to the combustion gases at the top of the cylinder bore 90 during operation of the engines. The rings 100 thus prohibit the head gasket 101 from blowing out as the rings are imbedded into the gasket 101 in the assembled position of the engine.

FIGS. 5 & 5A illustrates another embodiment of the invention. In this embodiment, a spiral groove is machined into the cylinder block about the cylinder bore rather than an annular groove. This embodiment is very similar to the previously described embodiment with the exception of the tool advancing mechanism mounted on the body portion. The cutting tool in this embodiment advances radially as the cutting tool is rotated. The arrangement is such that a spiral groove of constant depth is machined into the cylinder block about the cylinder bore. This spiral groove helps contain the high gas pressures developed in the cylinder bore without the necessity of an intermediate copper or steel ring 100, as described with respect to FIG. 4.

As is illustrated in FIG. 5, the machining device includes a rotating assembly 201 that is attached to cap 256 similar to that hereinbefore described. A handle 210 is attached to a shaft 202. Shaft 202 is secured by shaft bearings 200 and 206 in a housing 203. The rotational motion of shaft 202 caused by the rotation of the ball handle 210 during operation is transmitted to threaded shaft 208 by meshing bevel gears 204, 204A connected to the adjacent ends of shafts 208 and 202. One end of shaft 208 is threaded into carriage 240 so that when shaft 208 rotates, the carriage 240 is advanced radially in or out depending on the direction of rotation of the threaded shaft 208. In operation, the tool 242 carried in carriage 240 traverses a spiral groove in the cylinder block about a cylinder bore as the handle 210 is rotated about body 258. The depth of this spiral groove can be controlled by screw 211.

Figure 6:
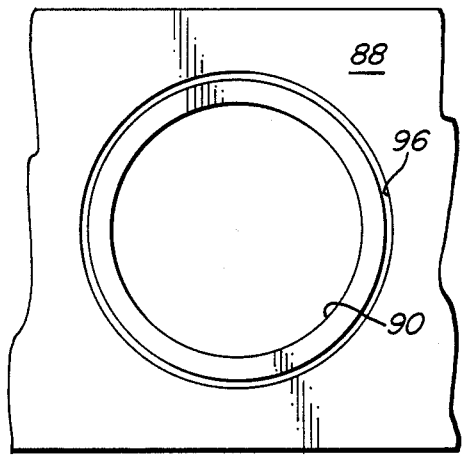
FIG. 6 is a plan view of a cylinder block illustrating a groove generated by the embodiment of the invention of FIG. 1.
Figure 6A:
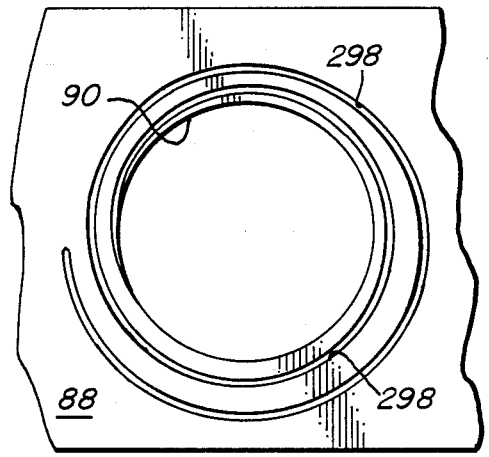
FIG. 6A is a plan view of a cylinder block showing a spiral grove generated by the embodiment of FIG. 5.

The two types of grooves that can be machined into a cylinder block by the respective embodiments of FIGS. 1 to 3 and by FIGS. 5 and 5A of the present invention are illustrated in FIGS. 6 and 6A. The invention, in one embodiment, can machine an annular groove 96 of a specified depth as shown in FIG. 6. The other embodiment of FIGS. 5 and 5A machines a spiral groove 298 of a specified depth. Vertical adjustment of the cutting tool 242 in FIG. 5 is attached by adjusting screw 243. Set screw 244 retains the tool 242 in a vertically adjustable tool holder 242A in the adjusted position In operation of the embodiment of FIG. 5, the depth of the cut to be made by the cutting tool is adjusted by setting the cutting tool 242 by the proper adjustment of the adjusting screw 243. With the cutting tool 242 adjusted to the proper cutting position, the tool holder 242A is fixed in the adjusted position by a set screw 244. The body of the device of FIG. 5 is then centered and secured within the base of a cylinder. The machining operation is effected simply by rotating the lever arm 228 by the handle ball 210. The arrangement is such that the ball handle 210 will rotate as the assembly 201 rotates relative thereto. Thus, the relative rotation of the ball handle 210 and its connected arm will cause the cutting tool 242 to traverse a spiral path or groove about the cylinder bore. The rotation of the ball handle 210 as the arm is rotated is transmitted to the threaded shaft 208 which causes the tool carrier to be radially displaced relative to the screw or threaded shaft. Accordingly, the cutting tool 242 will traverse a spiral groove as the cutting tool is axially displaced with the tool carrier, as the assembly 201 is rotated.

From the invention described, it will be apparent that the tool described enables one to machine a groove in the block of an internal combustion engine in situ, thereby avoiding the need to remove the block from the vehicle and sending the same to a machine shop for machining. The tool centered in situ within the bore of a cylinder can thus be effectively operated by a relatively unskilled operator, and the desired grooves being machined in a readily simply, expedient and inexpensive manner. The described tool is thus readily portable, and the machining operation can be readily effected in the field.

While the invention has been described with respect to several embodiments, it should be understood that variations and modifications may be made without departing from the scope and spirit of the invention.

What is claimed is:

1. A device for machining a groove about a cylinder bore in an engine block comprising
   a body portion,
   means on said body portion for securing said body portion in situ within a cylinder bore of an engine block,
   a laterally extending arm having a free end,
   means for supporting said arm at the other end thereof on said body portion of pivoting and rotating relative said body portion,
   a handle means rotatably mounted adjacent to said free end of said arm for producing said rotation of said arm relative to said body portion,
   a cutting tool means for cutting a groove about the cylinder bore, said cutting tool means including a cutting tool mounted on an intermediate portion of said arm for rotation with said arm to cut said groove about said bore, and a lever pivotably mounted at one end thereof to said arm and having its other end engaging said handle means,
   a fulcrum disposed intermediate said lever about which said lever is permitted to pivot relative to said arm upon the rotation of said handle means for producing rotation of said arm and causing said lever to pivot relative to said arm for advancing said cutting tool toward the engine block during a machining operation.

2. A device for machining a groove about a cylinder bore of an engine block as defined in claim 1, wherein said cutting tool comprises
   a lever pivotably mounted at one end to said arm and having a free end engaging said handle means,
   a fulcrum means disposed intermediate said lever about which said lever is permitted to pivot relative to said arm,
   said handle means including a threaded screw and a connected handle whereby said handle is free to rotate relative to said arm to effect displacement of said arm relative to said lever for advancing said cutting tool during a machining operation.

3. A device for machining a groove about a cylinder bore in a cylinder block of an engine comprising:
   a body portion,
   means associated with said body portion for securing said body portion within cylinder bore of an engine block,
   a cap rotatably mounted on said body portion,
   an arm pivotably attached at one end to said cap and said arm having a free end,
   a handle rotatably attached adjacent said free end of said arm for rotating said arm about the cylinder bore a cutting tool positioned between said one end and said free end of said arm, for rotation with said arm to cut said groove about said bore and
   means connected to said handle for imparting a feed motion to said cutting tool in addition to said rotation whereby rotation of said arm by said handle effects rotation of said handle relative to said arm to activate said means for imparting said feed motion for progressively advancing said cutting tool during a machining operation.

4. A device for machining a groove in a cylinder block as in claim 3 and comprising mean for selecting the depth of the groove to be machined.

5. A device for machining a groove in a cylinder block as in claim 3 comprising
means for effecting radial adjustment of said cutting tool relative to the center of said body portion.

6. A device for machining a groove in a cylinder block as in claim 3 wherein said means for securing said body portion comprises
a shaft screwed to said body portion,
a fixed cam surface on said shaft,
a second cam means mounted on said shaft for movement relative thereto,
transversely extending centering means arranged to engage with said fixed cam surface and said second cam means to locate said body portion within the cylinder bore,
a biasing means for exerting force on said secnd cam means, and
means for effecting the rotation of said shaft relative to said body, said cam surface and second cam means effecting radial displacement of said centering means for securing and centering said body within a cylinder bore.

7. A device for machining a groove in a cylinder block as defined in claim 3 wherein said means for advancing the cutting tool comprises
means for advancing said cutting tool axially to the cylinder bore during a machining operation.

8. A device for machining a groove in a cylinder block as defined in claim 7 wherein said means for imparting a feed motion to said cutting tool comprises
means for feeding said cutting tool radially along said arm during a machining operation.

9. A device for machining a groove in a cylinder block as in claim 8, wherein said means for advancing said cutting tool radially with respect to the cylinder bore comprises
a first shaft attached to said handle,
a first bevel gear attached to the other end of said shaft,
a second bevel gear meshing with said first bevel gear,
a second shaft attached to said second bevel gear, said second shaft being threaded at the end opposite said second bevel gear, and
a tool carriage threaded onto said second shaft whereby said tool carriage moves axially along said second shaft as said second shaft is caused to rotate when said handle is rotated.

10. A device for machining a groove about a cylinder bore in a cylinder block of an enging comprising:
a body portion,
means associated with said body portion for securing said body portion within cylinder bore of an engine block
a cap rotatably mounted on said body portion,
an arm pivotally attached at one end thereof to said cap, and said arm having a free end,
a handle rotatably attached adjacent said free end of said arm,
a cutting tool positioned between said one end and said free end of said arm, and
means associated with said arm for advancing said cutting tool as said handle and arm are rotated relative to one another about said body portion,
wherein said means for advancing the cutting tool comprises
means for advancing said cutting tool axially to the cylinder bore during a machining operation,
wherein said means for advancing said cutting tool axially with respect to the cylinder bore comprises
a lever pivotably attached to said arm at one end,
a pin slidably extending transversely through said arm, one end of said pin contacting said lever and the other end of said pin contacting said cap, and
a threaded shank connected to said handle, said shank being threaded into said free end of said arm, said lever having a free end disposed between said handle and said free end of said arm whereby said arm and cutting tool attached to said arm moves axially relative to said cylinder bore as said handle is rotated to cut an annular groove of a predetermined depth.

11. A device for machining a groove about a cylinder bore in a cylinder block of an engine comprising:
a body portion,
means associated with said body portion for securing said body portion within cylinder bore of an engine block
a cap rotatably mounted on said body portion,
an arm pivotably attached at one end thereof to said cap, and said arm having a free end,
a handle rotatably attached adjacent said free end of said arm,
a cutting tool positioned between said one end and said free end of said arm, and
means associated with said arm for advancing said cutting tool as said handle and arm are rotated relative to one another about said body portion,
wherein said means for advancing the cutting tool comprises
means for advancing said cutting tool axially to the cylinder bore during a machining operation,
wherein said means for advancing said cutting tool axially with respect to the cylinder bore comprises
a lever pivotably attached to said arm at one end, said lever having a cam surface adjacent the end attached to said arm,
a pin slidably extending transversely through said arm, one end of said pin contacting said cam surface and the other end of said pin contacting said cap, and
a threaded shaft, one end connected to said handle and the other end threaded into said free end of said arm, the free end of said lever being restrained between said handle and said free end of said arm whereby said cutting tool attached to said arm moves axially as said handle is rotated relative to said arm.

12. A hand operated device for machining a groove about a cylinder bore in an internal combustion engine block comprising
a body portion adapted to be received within the bore of a cylinder,
means for centering and securing said body portion within the bore of a cylinder,
a cap rotatably mounted on the upper end of the body portion,
a transversely extending arm pivotally mounted at one end to said cap, whereby said arm is free to rotate about said body portion, and said arm having a free end, a cutting tool carried intermediate the ends of said arm, means for adjusting said cutting tool radially along said arm, means for adjusting the cutting depth of said cutting tool, a handle having a threaded shaft, said threaded shaft being connected to said free end of said arm whereby said threaded shaft tends to unscrew relative to said arm during a machining operation, and a lever, said lever being pivoted at one end to said arm and having a free end disposed in engagement with said handle, a fulcrum pin extending through said arm, said fulcrum pin being disposed between said pivoted end and free end of said lever, and said fulcrum pin having its opposed ends disposed in engagement with said cap and said lever, whereby the relative rotation of said arm and connected handle during a machining operation effects progressive advancement of the cutting tool to effect the machining of a groove about the cylinder bore.

13. A device for machining a groove about a cylinder bore in an engine block comprising:

a body portion, means on said body portion for securing said body portion in situ within a cylinder bore of an engine block, a laterally extending arm, means for pivotably connecting said arm to said body portion at one end, said arm having a free end extending radially thereof, said arm being rotatably mounted on said body portion for rotation about the cylinder bore, a handle means rotatably journalled to said free end of said arm for producing said rotation, a cutting tool mounted intermediate the ends of said arm for rotation with said arm to cut said groove about said bore, feed means connected between said cutting tool and said handle means for imparting a feed motion to said tool in addition to said rotation produced by said handle means whereby rotation of said arm by said handle means effects rotation of said handle means relative to said arm to activate said means for progressively advancing said cutting tool in said feed motion during a machining operation.

14. A device for machining a groove about a cylinder bore in an engine block comprising a body portion, means on said body portion for securing said body portion in situ within a cylinder bore of an engine block, a laterally extending arm, means for pivotably connecting said arm at one end thereof relative to said body portion and having a free end extending radially thereof, said arm being rotatably mounted relative to said body portion to extend over the engine block, handle means rotatably mounted adjacent the free end of said arm for producing said rotation, a cutting tool means including a cutting tool, mounting means for slidably mounting said cutting tool on an intermediate portion of said arm for rotation with said arm about the cylinder bore whereby rotation of said arm by said handle means effects rotation of said handle means relative to said arm, and a drive means interconnected between said handle means and said mounting means whereby the rotation of said handle means effects radial displacement of said cutting tool along said arm causing said cutting tool to traverse a spiral path during a machining operation.

* * * * *